(No Model.) 6 Sheets—Sheet 1.

R. W. PAIN.
MUSICAL INSTRUMENT.

No. 558,562. Patented Apr. 21, 1896.

Fig. 1.

Witnesses
Wm A Pollock
Jas. A Cullen

Inventor
Robert W Pain
by Edwin H Brown
his Attorney

ANDREW B. GRAHAM, PHOTO-LITHO. WASHINGTON, D.C.

(No Model.) 6 Sheets—Sheet 4.
R. W. PAIN.
MUSICAL INSTRUMENT.

No. 558,562. Patented Apr. 21, 1896.

Fig. 4.

Witnesses
Geo. Wadman
Wm. A. Pollock

Inventor
Robert W. Pain
by Edwin H. Brown
his Attorney

(No Model.) 6 Sheets—Sheet 5.

R. W. PAIN.
MUSICAL INSTRUMENT.

No. 558,562. Patented Apr. 21, 1896.

Witnesses
Wm. A. Pollock
Jas. A. Cullen

Inventor
Robert W. Pain
by Edwin H. Brown
his Attorney

(No Model.)  6 Sheets—Sheet 6.

R. W. PAIN.
MUSICAL INSTRUMENT.

No. 558,562.  Patented Apr. 21, 1896.

Witnesses:
D. H. Haywood
Wm. A. Pollock

Inventor:
Robert W. Pain
by Edwin H. Brown
his Attorney

United States Patent Office.

ROBERT W. PAIN, OF NEW YORK, N. Y.

MUSICAL INSTRUMENT.

SPECIFICATION forming part of Letters Patent No. 558,562, dated April 21, 1896.

Application filed December 31, 1894. Serial No. 533,407. (No model.)

*To all whom it may concern:*

Be it known that I, ROBERT W. PAIN, a citizen of the United States, residing in New York city, in the county and State of New York, have invented certain new and useful Improvements in Musical Instruments, of which the following is a specification.

I will describe a musical instrument embodying my improvement, and then point out the novel features in claims.

In the accompanying drawings.

Similar letters of reference designate corresponding parts in all the figures.

$A'\ A^2\ A^3\ A^4$ designate sound-producing devices. In the present example of my improvement these sound-producing devices consist of reeds, and there are four banks of these reeds.

The reeds are arranged in cells $B'\ B^2\ B^3\ B^4$, which may be of ordinary form and controlled by mutes $C'\ C^2\ C^3\ C^4$. These mutes may be operated separately by ordinary stop-rods C to bring into use any one or more of the banks of reeds, or they may be all operated by one contrivance—as, for instance, by a stop-rod $C^5$.

As I do not claim anything in the mechanism whereby the different stops are enabled to control the mutes separately, I shall not further describe such mechanism.

Figure 1:
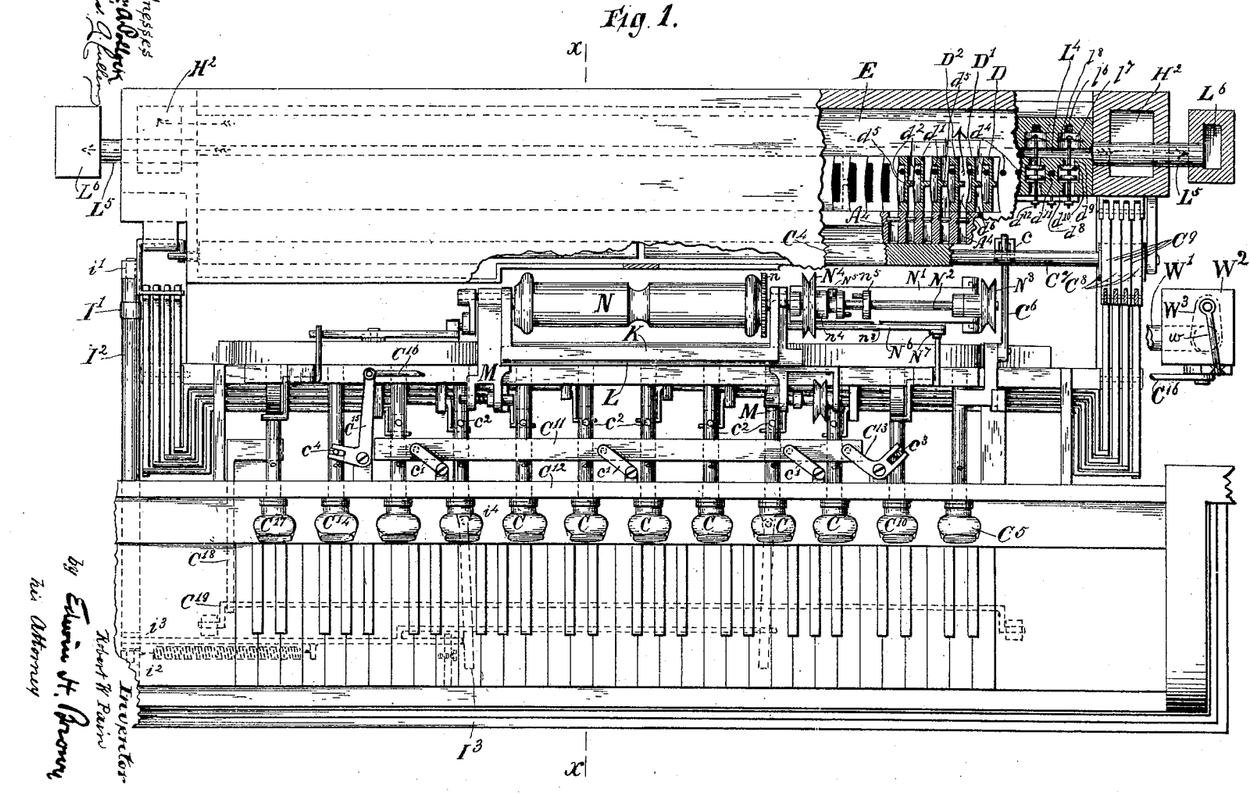
Figure 1 is a top view of the principal parts of a musical instrument embodying my improvement, the case being wholly omitted and certain parts being shown in section.
Figure 2:
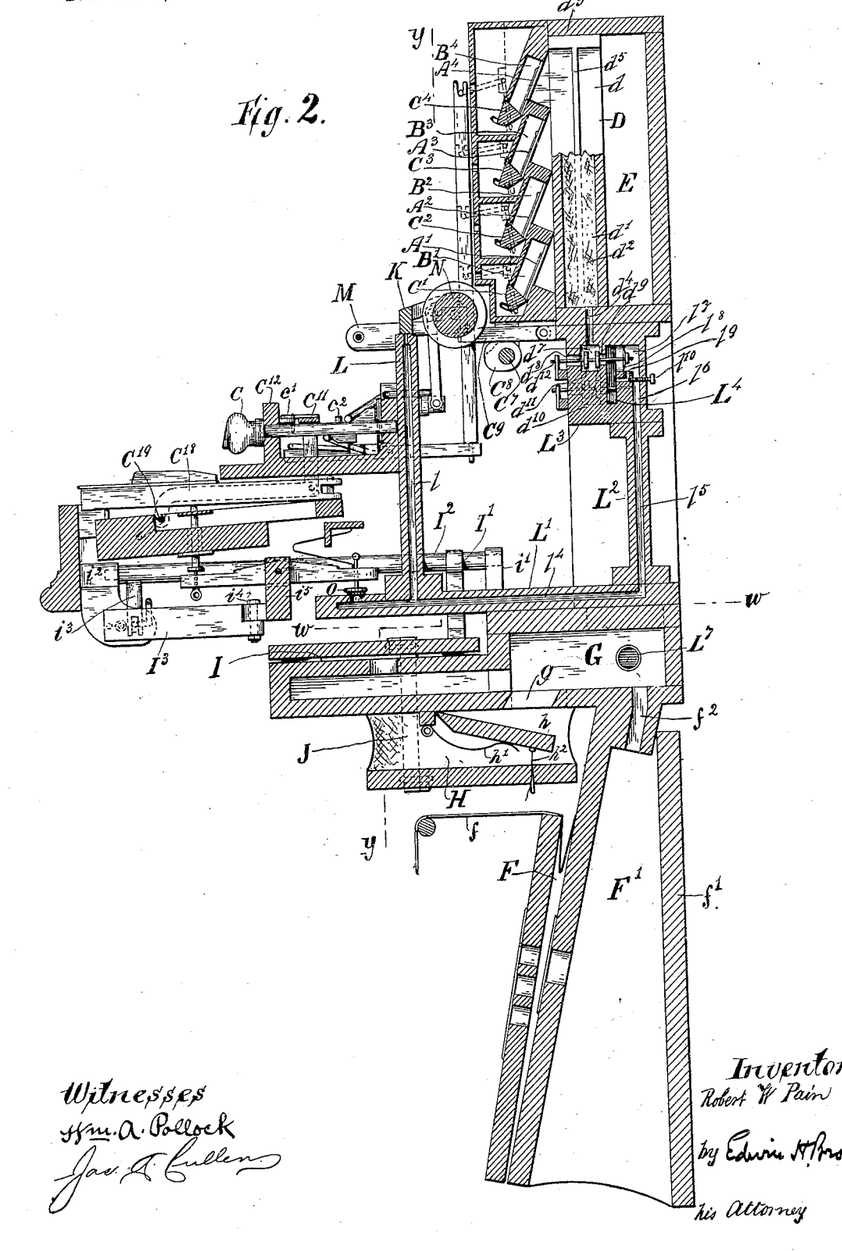
Fig. 2 is a vertical transverse section of the same at the plane of the dotted line $x\ x$, Fig. 1.
Figure 3:
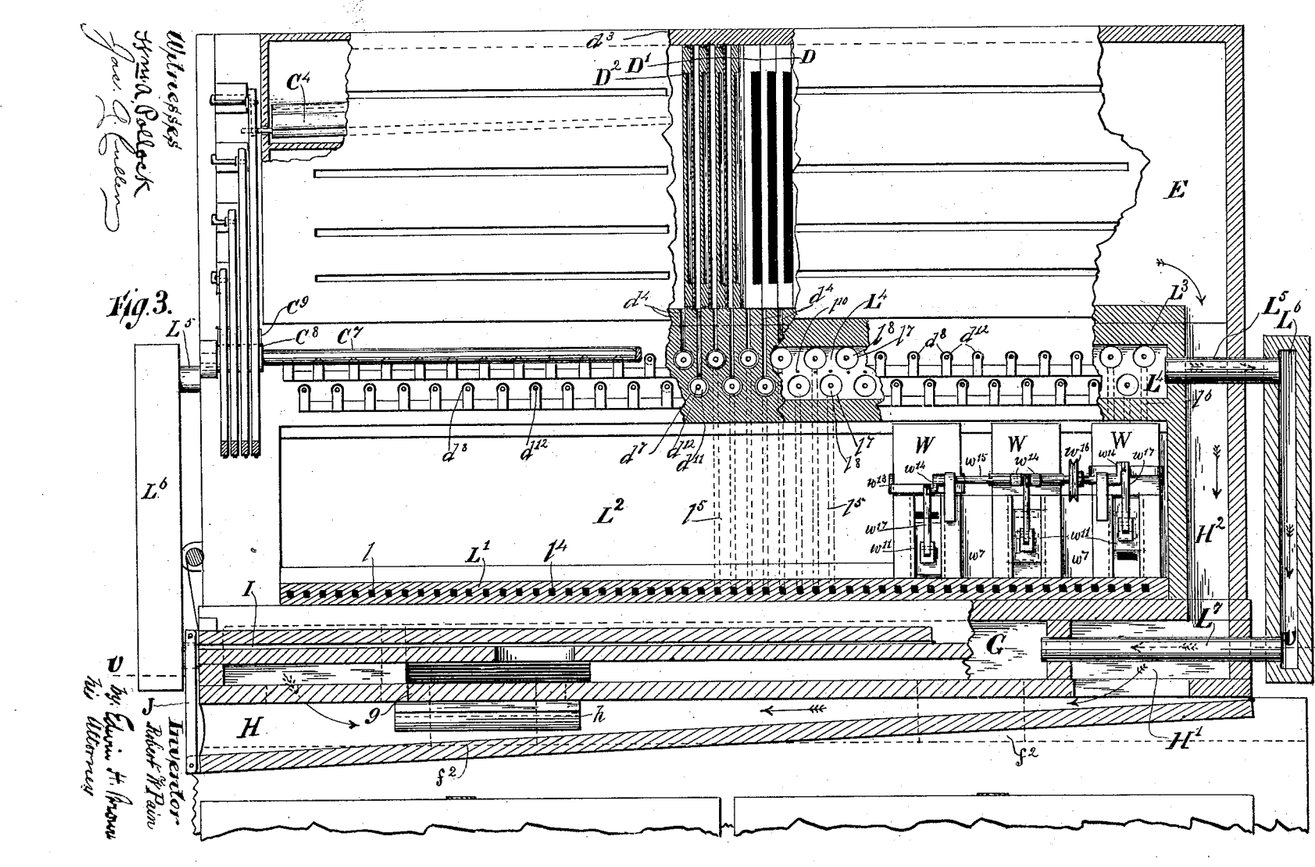
Fig. 3 is a sectional front elevation, the section being taken at the plane of the dotted line $y\ y$, Fig. 2. In this view certain parts are broken away.
Figure 4:
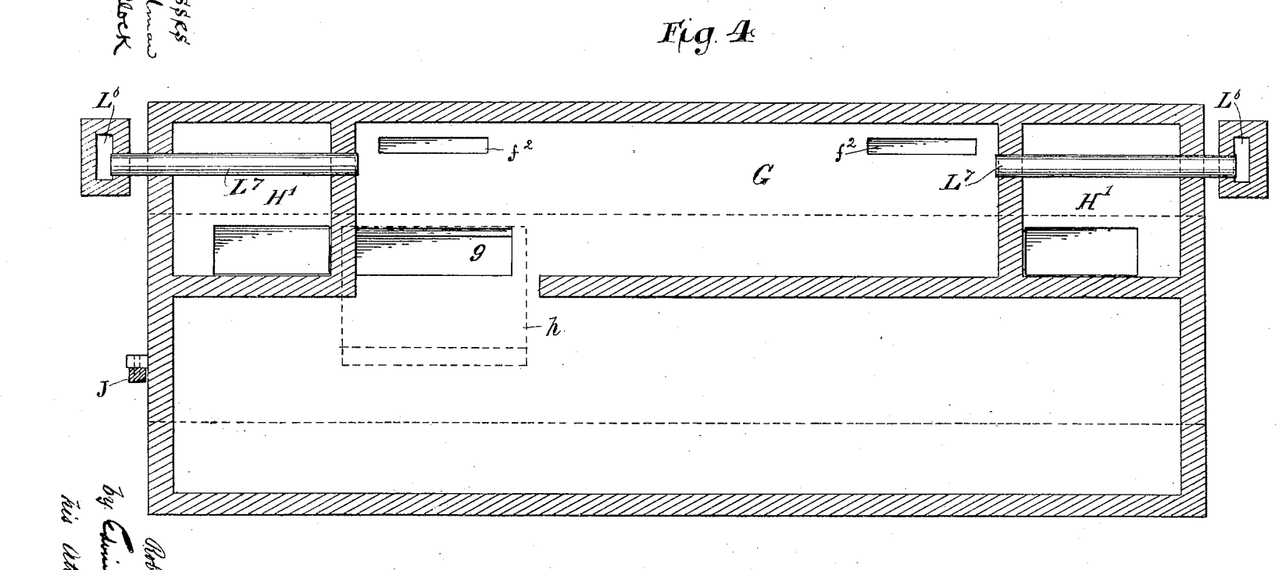
Fig. 4 is a horizontal section taken at the plane of the dotted line $v\ v$, Fig. 3.

Preferably the device which is employed to operate all the mutes, and which in the present instance consists of the stop $C^5$, will be so combined with the mutes as to operate them successively instead of operating them all together. The mechanism for accomplishing this I will now describe, premising that it is best illustrated in Figs. 1, 2, and 3. To the rear end of the stop-rod $C^5$ is pivotally connected a rod $C^6$, which is also connected with an arm $c$, that extends radially from a rock-shaft $C^7$. Affixed to this rock-shaft are two sets of cams $C^8$, each set being of a number corresponding to the number of mutes. These cams may be of similar shape, but they are arranged upon the rock-shaft, so that one will act slightly in advance of the other. They coact with a number of levers $C^9$, which rest upon their upper surfaces. These levers $C^9$ connect with upright rods of ordinary construction, and the latter in turn are connected with the ends of the mutes, so that each mute will be shifted by power applied to both its ends. The only feature of importance in this connection is the one consisting of the mechanism which, by force applied to a single draw or stop rod, will raise all the mutes, but will do so one after the other.

While on the subject of the stop-rods it may be well to explain that a rod $C^{10}$, which is similar in construction and operation to the stop-rods C, controls the direction of movement of the wind-motor, which is employed in the instrument to move the perforated music-sheet, and consequently the direction of the movement of said sheet. This rod $C^{10}$ is combined with the stop-rods C, so that if any one of the stop-rods C is pulled out the rod $C^{10}$ will be automatically moved in and conversely, so that each time that the rod $C^{10}$ is moved outward the stop-rods will be moved in. This is quite an important feature, because it is necessary to pull out the rod $C^{10}$ after playing a piece of music in order to cause the music-sheet to be rewound upon the music-roll, and it often happens with instruments of ordinary construction that the rod $C^{10}$ is left out after the introduction of another sheet of music and the pulling out of stops preliminary to playing. Thus a sheet of music which has been attached to the take-up roll will often be detached and necessitate the trouble of reattaching it. As it is necessary to pull out one of the stop-rods before any playing can be done, it is obviously advantageous that the act of pulling out the stop-rod will return the rod $C^{10}$ to its normal position. The means here shown for combining the stop-rods with the rod $C^{10}$ comprise a bar $C^{11}$, which extends across the stop-rods and is connected by links $c'$ to a stationary part $C^{12}$ of the instrument. In the present instance the bar $C^{11}$ lies on top of the stop-rods rearward of the stop-board $C^{12}$, which is a board through which the stop-rods pass. Preferably the bar $C^{11}$ will be faced with felt or other soft material on the under side. The links $c'$ are pivotally connected at one end to the bar $C^{11}$ and at the other end to brackets extending from the stop-board $C^{12}$.

From the stop-rods in the rear of the bar $C^{11}$ extend pins $c^2$, which preferably will be fitted with antifriction-rollers. These pins are so spaced that when the stop-rods are pulled out said pins will be moved adjacent to the bar $C^{11}$. The pins $c^2$ do not contact with the bar $C^{11}$ except when the bars are pulled outward. At one end the bar $C^{11}$ is pivotally connected with one arm of a bell-crank lever $C^{13}$, which is fulcrumed at the middle to a bracket extending rearwardly from the stop-board $C^{12}$, and at the other end is forked to engage with a pin $c^3$, extending from the rod $C^{10}$.

It is obvious that if any of the stop-rods C occupy their outer positions at the time that the rod $C^{10}$ is pulled outwardly the outward movement of the latter will, through the agency of the lever $C^{13}$, shift the bar $C^{11}$ in such manner that the latter will, by acting against the pins $c^2$ of such stop-rods, force these stop-rods inward. It will also be seen that if the rod $C^{10}$ is left in its outer position at a time when one of the stop-rods C is pulled outward the pin $c^2$ of the latter will shift the bar $C^{11}$, so as to rock the lever $C^{13}$ in the proper manner to force the rod $C^{10}$ inward.

Besides the stop-rods C and the similar rods $C^5$ $C^{10}$ there is a rod $C^{14}$, which is similar in construction and operation. This is connected by a radial pin $c^4$ with a bell-crank lever $C^{15}$, which is fulcrumed between its ends to a bracket extending rearwardly from the stop-board $C^{12}$, connected with a rod $C^{16}$, that serves to control the wind-motor before mentioned, as will be clearly explained when describing the motor and its appurtenances.

The musical instrument which I have chosen to illustrate the improvement is provided with a keyboard and so constructed that the sound-producing devices may be played either manually or mechanically under control of the perforated music-sheet. The organization is such that all the banks of sound-producing devices may be played either manually or mechanically. To prevent the accidental operation of a key while the instrument is being played mechanically, it is desirable to provide means whereby the function of the keys may be suppressed during the mechanical playing of the instrument. For this purpose there is a rod $C^{17}$, which is similar in construction and operation to the stop-rods C. Connected to it is a rod $C^{18}$, that extends to a rocking bar $C^{19}$. The latter is bent transversely near its ends and at the extreme ends is bent parallel to its main portion, so as to form journals. By rocking it in one direction the main portion will rise under the keys. This is accomplished by the drawing out of the rod $C^{17}$. A reverse movement of the rod $C^{17}$ will lower the rod $C^{19}$ and leave the keys free to be used. It may be added here, although in anticipation of what will be more fully explained hereinafter, that the inward movement of the rod $C^{17}$ applies a cover K to the tracker-board L, over which the perforated music-sheet advances.

Figure 7:
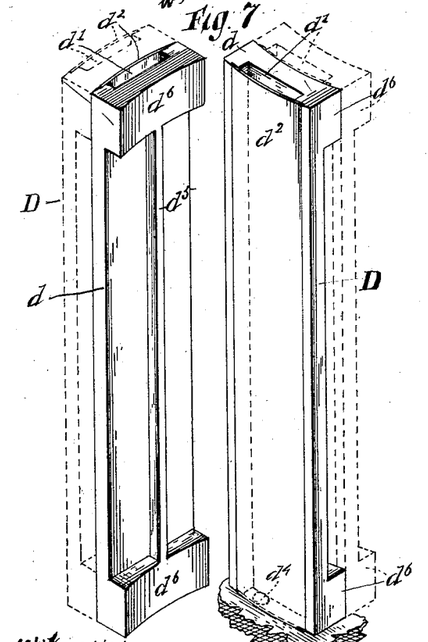
Fig. 7 is an isometrical perspective view of one of a series of valves for controlling the sound-producing devices, said valves being represented as having component parts separated for the purpose of illustrating their construction. In this view parts comprised in additional valves are indicated by dotted lines.
Figure 8:
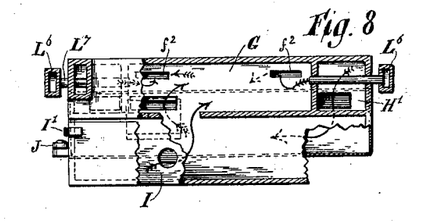
Fig. 8 is a sectional plan taken upon a reduced scale, as indicated by dotted lines $w\ w$, Fig. 2.

I will now describe the valves D, which immediately control the speaking of the reeds. Their construction may be best understood by reference to Fig. 7; but they are also illustrated in Figs. 1, 2, and 3. Each of these valves comprises a block $d$, in one face of which is formed a channel $d'$, which is covered by a strip of flexible material $d^2$, that may well consist of leather. The chamber thus formed is closed at the top by a portion $d^3$ of the action-frame, as may be seen at Fig. 2. The bottom of this chamber communicates with a duct $d^4$, which whenever it is desirable to cause a speaking of the corresponding sound-producing devices is put in communication with the wind-inducing apparatus of the instrument, the music-sheet being the device which controls the action of such duct. The wind apparatus and various devices which are intermediate of the music-sheet and the said duct I will presently describe in detail.

I have said enough to make it clear that at times each chamber, consisting of a channeled block $d'$ and strip of flexible material $d^2$, will be put into communication with the wind-inducing apparatus. The musical instrument illustrated by the drawings is intended to have exhaust-bellows, and therefore whenever one of these chambers D D' $D^2$ is put into communication with a duct $d^4$ its flexible strips $d^2$ will be forced into the channel $d'$. When this happens, air is permitted to pass the outer side of the flexible strip $d^2$ (not that side which is toward the channel $d'$) to cause the speaking of the reed. To control the passage of air necessary for the speaking of a reed, each flexible strip $d^2$ coacts with a bridge or rib $d^5$.

As here shown, the back of each block $d$ (by this I mean the unchanneled side) has a bridge or rib $d^5$ formed vertically upon it. At each end of the bridge or rib the block has a transverse extension $d^6$, and these transverse extensions of each block fit against the flexible strip $d^2$ of the next adjacent block.

Behind the valves D is a wind-chest E, which is in communication with the wind-inducing apparatus. Whenever one of the flexible strips $d^2$ of a valve D is drawn into the channel $d'$ of said valve, it will leave the opposite bridge or rib $d^5$ of the next adjacent valve D, and thus establish communication between the wind-chest E and the cell of the reed which corresponds to the thus actuated valve. Assuming that the mute of such cell is open, atmospheric air will thus be induced to flow through the reed to the wind-chest E.

It may be well now to describe the wind-inducing apparatus.

F designates exhaust-bellows, which may be operated in any suitable manner—as, for instance, by ordinary pedals. I have only shown a strap $f$ as the means for operating one of these bellows. It may extend to any source of power. Of course there may be any desirable number of exhaust-bellows, and they may alternate in their operation as usual.

F' is an equalizer, which, as usual, is made in the form of a large bellows, $f'$ being its expansible side. This equalizer communicates by means of a duct or ducts $f^2$ with a wind-chest G. For the sake of clearness it may be well to call the wind-chest G the main wind-chest and the wind-chest E the wind-chest for the sound-producing devices.

H designates a chamber capable of collapsing and expanding more or less. It is shown as made of bellows-like construction, but it has no valves. It is in communication with the wind-chest E for the sound-producing devices. As here shown, the chamber H communicates directly with a chamber H', and the latter communicates with a trunk H², which opens into the wind-chest E for the sound-producing devices. This chamber H is shown as arranged below the wind-chest G and as communicating with the wind-chest G through one or more holes $g$ in the latter. For each hole $g$ there is in the chamber H a valve $h$, which is here shown hinged in place at one end and pressed upwardly by a spring $h'$. The free end of the valve is connected in any suitable manner—as, for instance, a flexible connection $h^2$—with the movable part of the chamber H. The connection between the valve $h$ and the movable part of the chamber H is to be such that when the chamber H is collapsed to the full extent the valve $h$ will reach its seat and close the opposite opening $g$.

I designates a chamber capable of being collapsed or expanded more or less and made, as here shown, in the form of a bellows, but without valves. It is in continuous communication with the wind-chest G. The movable part of the chamber H is connected with the movable part of the chamber I in any suitable manner—as, for instance, by rods J, extending outside the chambers and the wind-chest G and connected with the movable parts of such chambers. Whenever the tension of the air within the wind-chest G is sufficient to collapse the chamber H to the fullest extent, the valve or valves $h$ will close the opening or openings $g$. Thereupon the communication between the chamber H and the wind-chest G will be cut off. The upward movement of the movable part of the chamber H due to the collapsing of this chamber will raise the movable part of the chamber I, and as this chamber I is continuously in communication with the wind-chest G said chamber I has a tendency to collapse. This tendency is exerted through the action of the rods J upon the chamber H. Whenever it preponderates, it will open the valve or valves $h$ and thus establish communication between the chamber H and the wind-chest G. This action will occur almost continuously, although it will be intermittent, and owing to this the valve or valves $h$ will vibrate to and from the opening or openings $g$ almost constantly. As the chamber H is in communication with the wind-chest E for the sound-producing devices, there will always be a different tension in the latter wind-chest from what there will be in the main wind-chest.

It is very important to provide for one tension of air for the sound-producing devices and a different tension for the other parts—as, for instance, pneumatic valves and pneumatics generally—for in this way the pneumatic valves and pneumatics may be operated with air under greater tension than would be suitable for sound-producing devices. In some musical instruments it is very advantageous to operate some of the sound-producing devices by air under different tensions, and this feature of the present improvement provides for that as well as for a differentiation of the air-tension employed to operate pneumatics.

The improvement also comprises means whereby the differentiation of air-tension in parts of a musical instrument may be varied at will. Obviously in the apparatus illustrated in the drawings any force applied upwardly to the movable part of the chamber I will oppose the action of the wind-chest G upon this chamber I, and hence will tend to change the amount of tension which otherwise would be exerted by the chamber I upon the wind-chest G. Force may be applied upwardly to the movable part of the chamber I by any suitable mechanical means. In the present instance I have shown the movable part of said chamber as connected to a strap I', which is wound around a rock-shaft I², that is supported in brackets $i'$ $i^2$. From the forward portion of this rock-shaft extends an arm $i^3$ and this coacts with the knee swell or lever I³, the latter being pivoted by a pin $i^4$ to a fixed rail $i^5$ of the instrument. Obviously by moving the knee-swell out of its normal position the rock-shaft $I^2$ may be made to wind up the strap $I'$ and thus raise the movable part of the chamber I. Many other arrangements might be employed, without departing from the invention, for exerting an opposing force to the wind-chest G upon the chamber I.

The perforated music-sheet has not been illustrated, because it is of ordinary construction. The music-roll is intended to be supported between brackets M. In one of these brackets there will be a shaft that will engage the music-roll.

N designates the take-up roll, to which the outer end of the music-sheet is attached. The music-sheet is drawn along by this take-up roll during the playing, and at such time the shaft previously mentioned as engaging with the music-roll runs freely. After the playing a change of connections may be made, so as to allow the take-up roll to run freely and so as to simultaneously impart motion to the music-roll through the shaft with which it is engaged. The mechanism for accomplishing this may be of ordinary construction.

Figure 9:
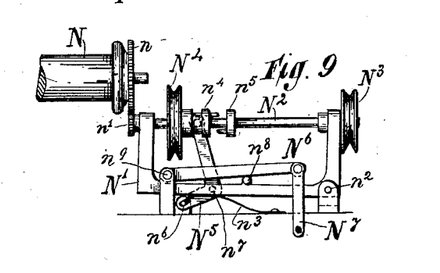
Fig. 9 is a view taken parallel with the front of the instrument and illustrating mechanism for winding a music-sheet.

In Fig. 9 I have shown that the take-up roll N is provided at one end with a gear-wheel $n$, which engages with a pinion $n'$, mounted upon a shaft $N^2$, which is supported in a rocking frame $N'$, the latter being pivoted at $n^2$ and normally pressed upwardly by a spring $n^3$ for the purpose of engaging the pinions $n'$ with the gear-wheel $n$. On the shaft $N^2$ is affixed a pulley $N^3$, and this is belted to the wind-motor. Loosely mounted upon the shaft $N^2$ is a pulley $N^4$, and this is belted to the aforesaid shaft which is engaged with the music-roll. The pulley $N^4$ is capable of movement lengthwise with the shaft $N^2$ and is provided with a clutch-piece $n^4$, which, upon a movement of the pulley lengthwise of the shaft $N^2$, may be engaged with or disengaged from a clutch-piece $n^5$ that is affixed to the shaft $N^2$. A bell-crank lever $N^5$ engages with a circumferential groove in the clutch-piece of the pulley $N^4$ and serves to move it lengthwise of the shaft $N^2$. This lever $N^5$ is fulcrumed to a pin $n^6$, which is supported by a stationary bracket and is pivotally connected by a pin $n^7$ with the rocking frame $N'$. The latter has a pin $n^8$ over which extends a lever $N^6$. This lever $N^6$ is fulcrumed by a pin $n^9$ to a stationary bracket, and at the free end is connected to a rod $N^7$, which is operated whenever the rod $C^{10}$ is manipulated. It will thus be seen that the rod $C^{10}$ determines the direction in which the perforated music-sheet shall be driven.

Figure 10:
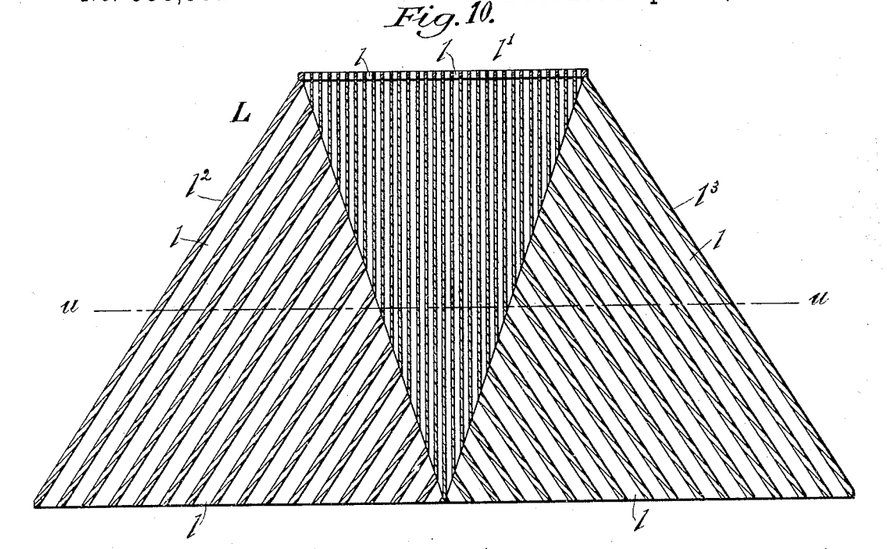
Fig. 10 is a vertical section, parallel with the front of the instrument, of a tracker-board over which a perforated music-sheet is intended to travel.
Figure 11:
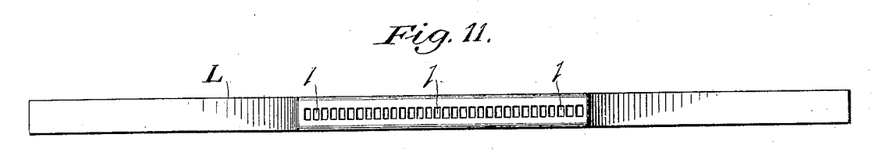
Fig. 11 is a top view of this tracker-board.
Figure 12:
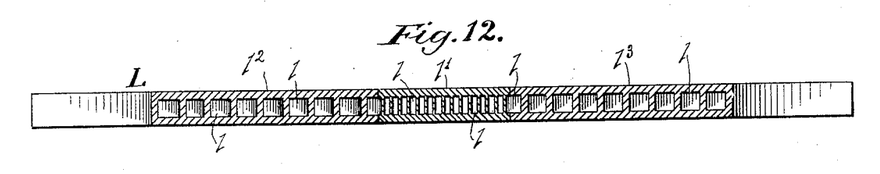
Fig. 12 is a horizontal section taken at the plane of the dotted lines $u\ u$, Fig. 10.

The tracker-board L may advantageously be made of three sections, as shown in Figs. 10, 11, and 12, for in this way small perforations may be used in the music-sheet, and consequently the width of the music-sheet may be less than otherwise would be necessary, and yet the ducts may be made sufficiently capacious to afford a free passage of air from the music-sheet. It will be seen that the tracker-board is made of three triangular sections, the center one $l'$ being provided with narrow vertical ducts $l$, and the other sections $l^2$ $l^3$ being provided with oblique ducts $l$, which are considerably larger. The divergence or spreading of the ducts accomplished in this way compensates for the difference in width of the music-sheet and the banks of sound-producing devices with the appurtenances of the latter. The ducts $l$ communicate with ducts $l^4$ in a horizontal board $L'$. The ducts $l^4$ may be parallel, and the forward ends are extended beyond the board L and are provided with openings which are controlled with valves O operated by manual keys. The cover K, previously mentioned, is pulled down over the tracker-board L when the instrument is to be played manually, thus suppressing the action of the tracker-board L. At the same time that the cover K is pulled down upon the tracker-board the rod $C^{19}$ is lowered, so as to permit of the operation of the keys. As already explained, when the cover K is raised from the tracker-board, so as to permit of playing the instrument mechanically, the rod $C^{19}$ is raised so as to suppress the keys.

The ducts $l^4$ communicate at their rear ends with vertical ducts $l^5$ and a board $L^2$. Above the board $L^2$ there is a block $L^3$, which is provided with vertical ducts $l^6$, corresponding to and communicating with the ducts $l^5$, and hence with the ducts of the tracker-board. The ducts $l^6$ terminate at their upper ends in chambers $l^7$, there being one for each duct. Each of these chambers $l^7$ is fitted with a flexible diaphragm $l^8$, on the other side of which is a wind-chest $L^4$, which is common to all of the diaphragms $l^8$. Each chamber $l^7$ communicates through a port $l^9$ with the chamber $L^4$. Preferably such port will be provided with a regulating device—such, for instance, as a screw $l^{10}$.

There is a duct $d^4$ corresponding to every duct of the tracker-board, and thus corresponding to every duct $l^6$ in the chambers $l^7$. Each duct $d^4$ communicates with a separate chamber $d^7$. Each chamber $d^7$ has an opening $d^8$, communicating with the atmosphere, and an opening $d^9$, communicating with the wind-chest $L^4$. In each chamber $d^7$ are two valves $d^{10}$ $d^{11}$, fastened to a single rod $d^{12}$, which is secured to the corresponding diaphragm $l^8$.

Each time that one of the ducts of the tracker-board L or the board $L'$ is open, air will pass to the corresponding chamber $l^7$ and force the diaphragm $l^8$ of such chamber toward the wind-chest $L^4$. This will cause the corresponding valve $d^{11}$ to close the port $d^8$, leading to the atmosphere, and to open the port $d^9$, leading to the chamber $D^4$. Thus the corresponding valve D will be operated and the corresponding sound-producing device caused to speak. When a port in the tracker-board L or board $L'$ is closed, the corresponding diaphragm will be reversely operated and the corresponding valve D will be cut off from communication with the chamber $L^4$ and put into communication with the atmosphere. This will cause the corresponding valve D to close and stop the speaking of the sound-producing devices.

The wind-chest $L^4$ communicates with a pipe or duct $L^5$, which passes across the trunk $H^2$ without communicating with it, and terminates in a trunk $L^6$. This trunk $L^6$ communicates with a pipe $L^7$, which passes through the chamber $H'$ without communicating therewith and extends into the wind-chest G. Consequently the chamber $L^4$ is constantly subject to the air of greater tension.

W designates the wind-motor. It is in communication with the wind-chest G by means of a pipe $W'$, but this pipe $W'$ does not pass directly to the motor, but, on the contrary, to a regulating-valve box $W^2$, containing a slide-valve $W^3$, with which the rod $c^{16}$ coacts. By manipulating the rod $C^{17}$ in the stop-board the valve $W^3$ may be shifted to vary the communication of the box $W^2$ with the wind-chest G.

The construction of the valve is immaterial. In the present instance it is rigidly affixed to its stem, and the latter is connected to a rod $w$, against which the rod $c^{16}$, or an appurtenance thereof, acts.

It will be understood, of course, that as the valve-box $W^2$ is in communication with the wind-chest G it is subject to air of greater tension.

The valve-regulating box $W^2$ communicates with the wind-chest $w^4$ of the motor W. This wind-chest is of course in the present instance an exhaust-wind chest.

Figure 5:
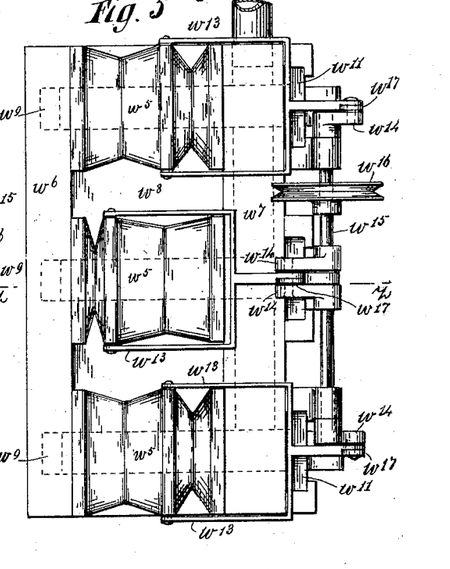
Fig. 5 is a top view of a wind-motor comprised in the instrument.
Figure 6:
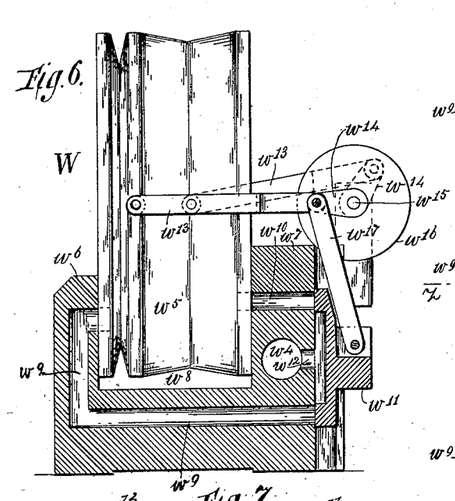
Fig. 6 is a vertical transverse section at the plane of the dotted lines $z\ z$, Fig. 5, a portion, however, intersected by this plane being shown in full side view.

The motor W comprises any desirable number of double collapsible and expansible chambers $w^5$. Each is of bellows-like construction and has three boards, two of which are fixed, the third being arranged between the two fixed boards and being movable between them. The two fixed boards are fastened to two opposite portions $w^6 \ w^7$ of a trough-shaped block $w^6 \ w^7 \ w^8$. Each of the chambers $w^5$ has a separate port $w^9$ in the block $w^6 \ w^7 \ w^8$. Each of these ports extends from its chamber $w^5$ down through the portion $w^6$ of the block $w^6 \ w^7 \ w^8$ and then horizontally through the portions $w^8 \ w^7$ of said block. Each of the chambers $w^5$ at the other side of its movable board communicates with a horizontal port $w^{10}$. The ports $w^9 \ w^{10}$ belonging to each chamber $w^5$ have combined with them a valve $w^{11}$, which is here shown as made in the form of a slide-valve and large enough to cover the outer ends of both ports $w^9 \ w^{10}$. Such valve has a chamber in its interior. Opposite the wind-chest $w^4$ a port $w^{12}$ extends to the outside of the block, there being one of these ports for each of the chambers $w^5$. Each valve $w^{11}$ may either cut off its two ports $w^9 \ w^{10}$ or establish communication between either of these ports and a port $w^{12}$, leading to the wind-chest $w^4$. When it establishes communication between one of the ports $w^9 \ w^{10}$ and the wind-chest $w^4$, it opens the other port $w^9$ or $w^{10}$ to the atmosphere. By alternately changing the communication of the ports $w^9 \ w^{10}$ with the wind-chest $w^4$ and with the atmosphere, the movable board to each chamber $w^5$ will be made to move first in one direction and then in the other between the fixed boards. Each chamber $w^5$ has pivotally connected to its movable board a bifurcated rod $w^{13}$, which is also connected with an arm $w^{14}$, extending from a shaft $w^{15}$. On the shaft $w^{15}$ is a pulley $w^{16}$, which is belted to the pulley $N^3$, before described. The crank-arms $w^{14}$ may be set at an angle of one hundred and twenty degrees or in any other suitable relation, so as to cause the movable boards of the chambers $w^5$ to operate in succession. A rod $w^{17}$ is pivotally connected at one end with the crank $w^{14}$ belonging to each chamber $w^5$, and at the other end with the valve $w^{11}$ belonging to such chamber, and hence constitutes a means for shifting such valve.

What I claim as my invention, and desire to secure by Letters Patent, is—

1. In a musical instrument, the combination of a tracker-board for controlling a music-sheet, a cover for said tracker-board, a number of manual keys, a bar for suppressing said keys, and a connection between the said cover and the said bar so that when one of these devices is put in operative position the other will be put in an inoperative position, substantially as described.

2. In a musical instrument which is organized to be played mechanically under control of a traveling music-sheet, the combination of means for moving said music-sheet in reverse directions, a handpiece for controlling the direction of the movement of the music-sheet, and stop-rods connected to said handle so that when said handle is moved to effect the rerolling or return movement of the music-sheet the stop-rods will be forced inward to stop the speaking of the sound-producing devices of the instrument and so that when any of such stop-rods is moved outward the said handle will be adjusted to cause the movement of the music-sheet in the proper direction for playing a tune, substantially as hereinbefore set forth.

3. In a musical instrument, the combination of stop-rods C, a bar $C^{11}$ connected by links $c'$ with a stationary part of the instrument, pins on the stop-rods rearward of said bar, a rod $C^{10}$ and an elbow-lever fulcrumed to a fixed part of the instrument and connected with said rod $C^{10}$ and bar $C^{11}$, substantially as hereinbefore set forth.

4. The combination with wind-inducing apparatus, of a main wind-chest, a wind-chest for sound-producing devices, and means intermediate of the main wind-chest and the wind-chest for the sound-producing devices for varying the tension of air for the sound-producing devices, substantially as hereinbefore set forth.

5. The combination with wind-inducing apparatus, of a main wind-chest, a wind-chest for sound-producing devices, and means intermediate of the main wind-chest and the wind-chest for sound-producing devices for varying the tension of air, said means comprising a collapsing and expanding chamber, substantially as hereinbefore set forth.

6. The combination with wind-inducing apparatus of main wind-chest, a wind-chest for sound-producing devices, means intermediate of the main wind-chest and the wind-chest for sound-producing devices for varying the tension of air, said means comprising a collapsing and expanding chamber, and a valve for controlling communication between said collapsing and expanding chamber and the main wind-chest, substantially as hereinbefore set forth.

7. The combination with wind-inducing apparatus, of a main wind-chest, a wind-chest for sound-producing devices, and means intermediate of the main wind-chest and the wind-chest for sound-producing devices for varying the tension of air for the sound-producing devices, said means comprising two collapsing and expanding chambers which are in communication with the main wind-chest and one of which is intermediate of the main wind-chest and the wind-chest for the sound-producing devices and is provided with a valve controlling its communication with the main wind-chest, substantially as hereinbefore set forth.

8. In a musical instrument, the combination with sound-producing devices and a wind-chest of intermediate valves consisting of a number of chambers, each having a flexible diaphragm on one side a bridge on the other side for coaction with the flexible diaphragm of the next valve, and extensions $d^6$ at the ends of the bridge adapted to closely fit the diaphragm of the adjacent valve, substantially as hereinbefore set forth.

9. In a musical instrument, the combination with sound-producing devices and a wind-chest therefor, of valves consisting of blocks $d$ having channels $d'$, flexible diaphragms $d^2$, ridges or ribs $d^5$ and transverse extensions $d^6$, substantially as hereinbefore set forth.

10. In a musical instrument, the combination with a valve consisting of a chamber having a flexible diaphragm on one side, a bridge on the other side for coaction with the flexible diaphragm of the next valve, and extensions at the ends of the bridge adapted to closely fit the latter-mentioned diaphragm, of a port $d^4$ leading to the chamber of the valve, a wind-chest $L^4$, valves controlling the communication between the port $d^4$ and the atmosphere, and between the port $d^4$ and the wind-chest $L^4$, and a diaphragm whose movements control the operations of the valves, substantially as specified.

11. In a musical instrument, the combination with a valve consisting of a chamber having a flexible diaphragm on one side, a bridge on the other side for coaction with the flexible diaphragm of the next valve, and extensions at the ends of the bridge adapted to closely fit the latter-mentioned diaphragm, of a port $d^4$ leading to the chamber of the valve, a wind-chest $L^4$, valves controlling the communication between the port $d^4$ and the atmosphere, and between the port $d^4$ and the wind-chest $L^4$, a diaphragm whose movements control the operations of the valves, and a regulating device consisting of a port $l^9$ and a throttling-screw $l^{10}$, substantially as specified.

12. In a musical instrument, the combination with sound-producing devices, of a tracker-board composed of three triangular sections fitted together side to side, the center section having vertical ports and the side sections having oblique ports, substantially as hereinbefore set forth.

13. In a musical instrument, the combination of sound-producing devices, wind-inducing mechanism, a tracker-board, means for moving a perforated music-sheet over the tracker-board and a motor for propelling such means and consisting of a number of bellows-like chambers severally having two fixed boards and an intermediate movable board, a shaft connected with the movable board and a valve shifted by power supplied from said movable board, substantially as hereinbefore set forth.

In testimony whereof I have signed my name to this specification in the presence of two subscribing witnesses.

ROBERT W. PAIN.

Witnesses:
 WM. A. POLLOCK,
 C. WASHVANTER, Jr.